United States Patent [19]
Kittle et al.

[11] Patent Number: 5,011,330
[45] Date of Patent: Apr. 30, 1991

[54] FOAM DISTRIBUTION APPARATUS

[75] Inventors: Paul A. Kittle; David Manlowe, both of West Chester, Pa.

[73] Assignee: Rusmar Incorporated, West Chester, Pa.

[21] Appl. No.: 564,367

[22] Filed: Aug. 8, 1990

[51] Int. Cl.$^5$ .............................................. B09B 1/00
[52] U.S. Cl. ................................... 405/129; 405/258; 405/263
[58] Field of Search ............... 405/128, 129, 258, 263, 405/269

[56] References Cited

U.S. PATENT DOCUMENTS

| | | | |
|---|---|---|---|
| 4,519,338 | 5/1985 | Kramer et al. | 405/128 X |
| 4,758,355 | 7/1988 | Levine | 405/128 X |
| 4,762,276 | 8/1988 | Foust | 405/128 X |
| 4,874,641 | 10/1989 | Kittle | 427/244 |

Primary Examiner—Dennis L. Taylor
Assistant Examiner—J. Russell McBee
Attorney, Agent, or Firm—Howson and Howson

[57] ABSTRACT

In an apparatus for laying down a blanket of foam on a waste disposal landfill or the like, an enlongate manifold carried across the rear end of a vehicle delivers foam to nozzle assemblies which are spaced apart along the length of the manifold. Each nozzle assembly includes a holder in the form of a block with a first bore communicating with the manifold and bifurcating into second and third bores which communicate with nozzles having fan-shaped flat spray patterns. The axes of the bores generally define an inverted Y-configuration with the nozzle of the second bore arranged to spray the foam downwardly to one side and within a plane angled forwardly from a transverse vertical plane with respect to the direction of forward movement of the vehicle, and with the nozzle of the third bore arranged to spray the foam downwardly to the opposite side and within a plane angled rearwardly from the transverse vertical plane.

10 Claims, 2 Drawing Sheets

FOAM DISTRIBUTION APPARATUS

BACKGROUND OF THE INVENTION

The present invention relates generally to fluid distribution systems, and more particularly to a novel and improved fluid distribution apparatus for laying down a blanket of foam on a waste disposal landfill or the like.

Environmental regulations usually require operators of waste disposal landfills to cover and seal the surface with a layer of soil at prescribed intervals such as at the end of each working day in order to contain unpleasant odors, noxious fumes and blowing trash, to prevent infestation by birds, rodents, insects, and in general to maintain sanitary conditions.

Due to the enormous amount of soil required and attendant high cost of labor and earth moving equipment, a recent innovation substitutes a foam composition for the soil. A process for producing a foam composition which is particularly effective for this purpose under various weather conditions is disclosed in U.S. Pat. No. 4,874,641 issued Oct. 17, 1989 to Paul A. Kittle. The foam composition is produced from an aqueous composition of an anionic surface-active sulfate and a carboxylic acid salt. A novel apparatus for storing and generating the foam is disclosed in commonly-owned U.S. Pat. application Ser. No. 07/564,368 filed Aug. 8, 1990, entitled "Foam Generating Apparatus", by David Manlowe and Paul A. Kittle. When the foam is applied at a thickness of about three inches, to the landfill surface, it becomes a barrier to the atmosphere.

In the prior art, a foam is sprayed over the refuse by a series of nozzles mounted across the rear of a vehicle carrying a foam generating unit. For example, U.S. Pat. No. 4,519,338 to Kramer et al. discloses an apparatus for applying foam on dumped waste in a landfill in which nozzles are spaced along a horizontal yoke and deliver flat spray patterns alternatingly angulated forwardly and rearwardly relative to the direction of movement of the vehicle thus ensuring that the foam completely covers all sides of any projecting or recessed refuse traversed by the vehicle. The nozzles are each connected by separate flexible hoses to a relatively high pressure output of a foam generator. At this pressure, the risk of leakage may become rather severe at the hose connections due to vibration and shaking as the vehicle moves over the landfill. These conditions have therefore mandated designs of greater complexity, higher maintenance costs, and larger spare parts inventories.

SUMMARY OF THE INVENTION

Accordingly, it is an object of the present invention to provide a novel and improved fluid distribution apparatus which will evenly apply a foam cover and sealant on a surface having irregular projections and recesses.

Another object is to provide an improved foam distributing apparatus which is particularly suitable for use on a vehicle having a foam generator traversing a waste disposal landfill.

Still another object of the invention is to provide a reliable foam dispensing apparatus of relatively simple design which will reduce operation and maintenance costs.

These and other objects of the invention are achieved by a fluid distribution apparatus in which a manifold, adapted to be mounted on a vehicle, delivers the fluid to a plurality of nozzle assemblies aligned in a row extending transversely to the direction of movement of the vehicle over an uneven surface. Each assembly defines a holder having a first passage which communicates with the manifold and bifurcates into second and third passages which communicate with nozzles having fan-shaped flat spray patterns. The nozzle connected to the second bore is oriented to spray the foam downwardly to one side and substantially within a plane angled forwardly from a transverse vertical plane with respect to the direction of movement of the vehicle: and the nozzle connected to the third bore is oriented to spray the foam downwardly to the other side and substantially within a plane angled rearwardly from the transverse vertical plane. In this manner all sides of any projecting or recessed objects are reached by the foam.

BRIEF DESCRIPTION OF THE DRAWINGS

For a better understanding of these and other objects and aspects of the invention, reference will be made to the following detailed description taken in conjunction with the accompanying drawings wherein.

DESCRIPTION OF THE PREFERRED EMBODIMENT

Figure 1:
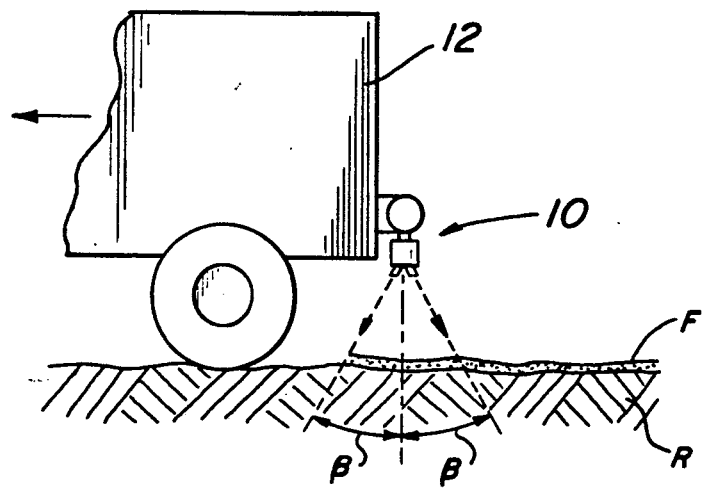
FIG. 1 is a schematic representation in side elevation of a fluid distribution apparatus according to the invention mounted on the rear end of a foam generating vehicle traversing a landfill.

Referring now to the drawings wherein like characters designate like or corresponding parts throughout the several views, FIG. 1 schematically illustrates a waste disposal landfill of refuse R in the process of being covered by a layer of foam F dispensed by the novel fluid distribution apparatus, indicated generally by the number 10, carried on a vehicle 12 together with a foam generating unit, such as disclosed in co-pending U.S. Pat. application Ser. No. 07/564,368, supra.

Figure 2:
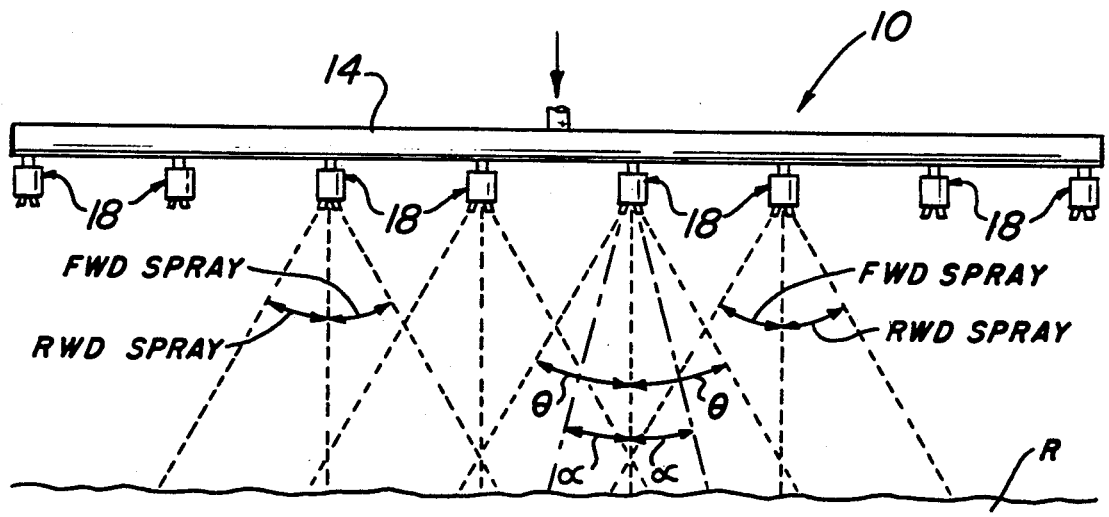
FIG. 2 is a rear view of the distribution apparatus of FIG. 1.

Referring to FIG. 2, foam distribution apparatus 10 includes an elongated header or manifold 14 of rigid pipe with closed ends horizontally mounted, such as by brackets not shown, across the rear end of vehicle 12. The length of manifold 14 is determined by the width of the desired foam swath, which is preferably not less than the width of the vehicle's track so that the wheels will not run over a previously deposited contiguous swath. Manifold 14 includes an inlet 16 located midway between the ends which communicates with a pressurized output from the foam generating unit causing the fluid to divide into two lateral streams. While only a single fluid inlet 16 is shown, manifold 14 may include additional spaced-apart inlets for reducing the pressure gradient along its length.

Figure 3:
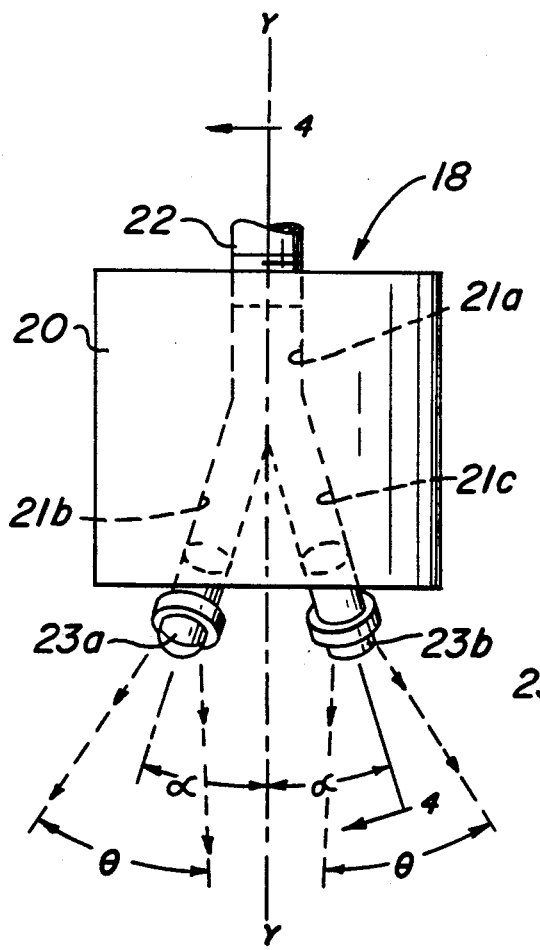
FIG. 3 is a schematic rear view representation of a nozzle assembly according to the invention utilized in the apparatus of FIGS. 1 and 2.
Figure 4:
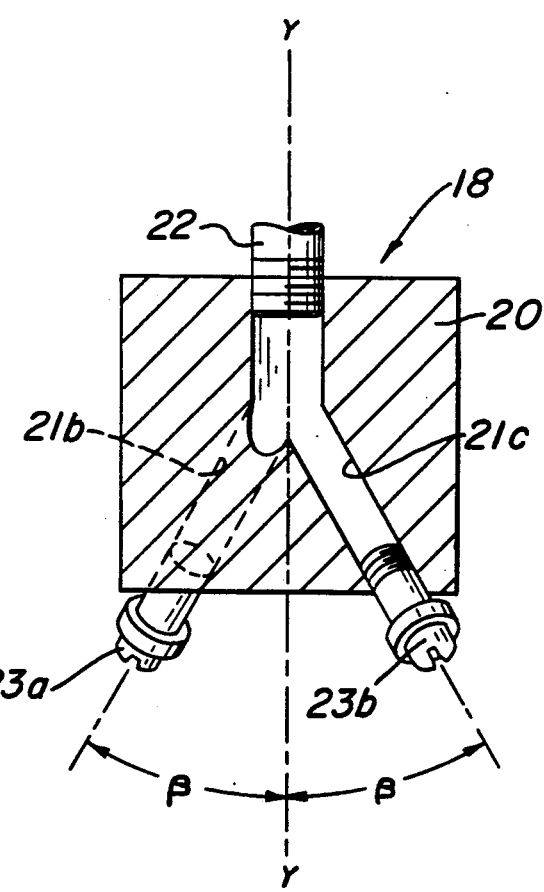
FIG. 4 is a view in cross section of the nozzle assembly taken along the line 4—4 of FIG. 3.

Nozzle assemblies 18 are rigidly connected to manifold 14 in a series at equally spaced intervals along the length thereof for spraying the foam obliquely downward in a desired pattern. Referring to FIGS. 3 and 4, each nozzle assembly 18 includes a holder 20 having a first bore 21a with a threaded inlet port communicating through a connector 22 with the lower side of manifold 14. Bore 21a bifurcates into second and third bores 21b and 21c with their axes defining a generally inverted Y-configuration. The axis of bore 21b extends obliquely downward; i.e. to one side at an angle α and forward at an angle β with respect to the vertical axis Y-Y; and the axis of bore 21c extends obliquely downward in the opposite direction, i.e., to the opposite side at angle α and rearward at angle β with respect to the vertical axis Y—Y.

The outlet ports of bores 21b and 21c are threaded to receive conventional nozzles 23a and 23b, respectively, for producing uniformly distributed fanshaped flat spray patterns within a spray angle θ. The edges of the pattern are preferably tapered to provide even distribution where they overlap adjacent patterns. The nozzles are rotatably positioned in the ports with the plane of the flat spray at an angle α from a vertical plane along the length of manifold 14. The angles α and θ are selected to insure complete coverage of the sides of any refuse R projecting from the landfill with sufficient overlap of adjacent foam deposits for a uniform thickness; and the angle β is selected to insure a complete cover on the front and rear sides of the refuse. In a preferred embodiment, a 7 foot long manifold is supported approximately 3 ½ to 4 feet above the surface of the landfill with nozzle assemblies 18 situated 7 ¼ inches apart. Nozzles 23a and 23b have a spray angle θ of approximately 30° and are set at side angles α about 7° and at forward and rearward angles β about 30°.

Some of the many advantages of the invention should now be readily apparent. For example, a fluid distribution apparatus is provided which significantly reduces risk of leakage by use of a single manifold for both support of a plurality of nozzles and for direct communication with a foam generating unit. The nozzles in each holder are fixed to maintain the desired forward, backward and lateral spray directions and to achieve complete foam coverage of refuse projecting above a waste disposal landfill. The apparatus is of simple design and construction for ease of manufacture and maintenance and for affording reduced inventory of parts.

It will be understood, of course, that various changes in the details, materials, steps and arrangements of parts, which have been herein described and illustrated in order to explain the nature of the invention, may be made by those skilled in the art within the principle and scope of the invention as expressed in the appended claims.

We claim:

1. In a system for laying a blanket of foam on a waste disposal landfill, the system including a vehicle for traversing the landfill and a foam generator carried by the vehicle, a foam distribution apparatus comprising:
    an elongate manifold for mounting on the rear end of the vehicle transverse to the direction of movement of the vehicle having an inlet for receiving the foam from the generator;
    a plurality of nozzle assemblies fixed to said manifold at spaced intervals along the length thereof, each assembly including a holder having a first bore communicating with said manifold for receiving the foam therefrom, second and third bores communicating with said first bore, and first and second spray nozzles communicating respectively with said second and third bores for producing a foam spray in first and second downward directions with respect to the direction of movement of the vehicle, the first direction being to one side and, forward, and the second direction being to the opposite side and rearward;
    whereby all sides of any projecting or recessed objects in the landfill are reached by the foam.

2. A foam distribution apparatus according to claim 1 wherein
    said first nozzle produces a flat spray pattern in a plane angled forwardly from a vertical plane transverse to the direction of movement of the vehicle; and
    said second nozzle produces a flat spray pattern in a plane angled forwardly from said vertical plane.

3. A foam distribution apparatus according to claim 1 wherein:
    the axes of said second and third bores define with the axis of said first bore a generally inverted Yconfiguration.

4. A foam distribution apparatus according to claim 3 wherein:
    said first bore is on a generally vertical axis;
    said second bore is angled to one side and forwardly with respect to the direction of movement of the vehicle; and
    said third bore is angled to the other side and rearwardly with respect to the direction of movement of the vehicle.

5. Apparatus for distributing a swath of fluid along a selected path comprising:
    an elongate pipe having closed ends, an inlet intermediate the ends, and a plurality of apertures spaced along the length thereof;
    a plurality of holders, each having an inlet passage communicating with one of said apertures and first and second outlet passages communicating with said inlet passage, said first outlet passage extending in an oblique direction laterally and longitudinally of said pipe, and said second outlet passage extending oppositely of said first passage in an oblique direction laterally and longitudinally of said pipe; and
    a plurality of nozzles connected to respective ones of said outlet passages.

6. Apparatus according to claim 5 wherein:
    the axes of said outlet passages define with the axis of said inlet passage a generally inverted Yconfiguration.

7. Apparatus according to claim 5 wherein:
    said inlet passage extends on a generally vertical axis;
    and said first and second outlet passages extend on opposite oblique axes laterally and longitudinally of said pipe.

8. Apparatus according to claim 7 wherein:
    said nozzles produce a flat spray pattern within planes angled from either side of a vertical plane transverse to the direction of the selected path.

9. Apparatus for distributing a swath of fluid along a selected path comprising:
    an elongated manifold;
    means providing a plurality of outlet passages in fluid communication with said manifold, said outlet passages being arranged in pairs along the length of said manifold with the outlet passages of each pair being located adjacent to each other;
    a first outlet passage of each pair extending in an oblique direction laterally and longitudinally of said manifold and a second outlet passage of the same pair extending oppositely of said first passage in an oblique direction laterally and longitudinally of said manifold; and
    a plurality of nozzles connected to respective ones of said outlet passages.

10. Apparatus according to claim 9 wherein the nozzles of each of said pairs of nozzles produce flat spray patterns within planes angled from either side of a vertical plane in which the direction of elongation of the manifold lies.

* * * * *